United States Patent

[11] 3,589,304

[72] Inventor James D. Haynes
Shawnee Mission, Kans.
[21] Appl No 847,175
[22] Filed Aug. 4, 1969
[45] Patented June 29, 1971
[73] Assignee The Darby Corporation
Kansas City, Kans.

[54] LOW PROFILE VEHICLE HOLD-DOWN
5 Claims, 5 Drawing Figs.

[52] U.S. Cl. .................................................. 105/369,
105/368
[51] Int. Cl. .................................................. B61d 45/00,
B60p 7/08
[50] Field of Search............................................... 105/368 T,
369 A, 368, 369; 280/179, 179.1; 296/1 A;
254/150, 161, 164; 248/361, 361 A, 119, 361

[56] References Cited
UNITED STATES PATENTS
1,634,350 7/1927 Briggs........................... 105/369 (A)
1,714,196 5/1929 Vara............................. 105/369 (A)
2,159,848 5/1939 Gibbons......................... 280/179 (.1)
3,298,324 1/1967 Schwiebert..................... 105/368 (T)
3,374,008 3/1968 Blunden et al.................. 105/368 (T)
3,391,907 7/1968 Vogelsang...................... 254/150

Primary Examiner—Drayton E. Hoffman
Attorney—Schmidt, Johnson, Hovey, Williams and Chase ABSTRACT: A holddown unit for anchoring cargo such as automobiles and similar vehicles to the deck of a railway car or other transporting equipment is adapted to slide between a pair of opposed side rails secured to the deck and has a winch which includes a rotatable drum to take up a lashing chain. The unit is provided with a two-way, reciprocable locking bolt that is insertable within any one of a series of holes along one of the rails for locating the unit in one position, or within any one of a series of holes along the other rail for locating the unit in another position. A single, specially configured latch spring is capable of holding the bolt in its locked condition at either end of its path of travel.

PATENTED JUN 29 1971 3,589,304

INVENTOR.
James D. Haynes
BY Schmidt, Johnson, Hovey,
Williams & Chase
ATTORNEYS

LOW PROFILE VEHICLE HOLD-DOWN

The relatively small amount of ground clearance provided in modern-day automobiles has presented a somewhat difficult problem of anchoring to the decks of railway cars, necessitating low profile holddown units. All of the necessary mechanism for such unit must therefore be confined within very narrow vertical limits.

It is an important object of my present invention therefore to provide a holddown unit of the aforementioned character which will clear the lowermost extremities of automobiles and the like between the wheels thereof and at the same time include all of the necessary components such as the winch assembly and the releasable mechanism of the unit for attaching it to the deck of a railway car.

Another important object of the instant invention is the provision of a low profile holddown unit which has a novel locking bolt that is transversely reciprocable into any one of a series of holes provided in a pair of rails that are in turn rigid to the deck of the transport vehicle.

Other objects include the way in which the locking bolt is releasably held at either end of its reciprocable path of travel; the manner of providing an easily accessible finger actuated lever for the bolt; and the way in which the unit is held against undue tilting and lateral movement during rotation of the chain takeup drum.

An important aim of my invention is to improve upon the holddown of my U.S. Pat. 3,120,375 of Feb. 4, 1964, as well as those of a copending application Ser. No. 706,483 filed Feb. 19, 1968, now Pat. No. 3,507,471, in the names of William J. Haynes, Jr. and Tommy W. Martin, both owned by the assignee of the instant invention. In the drawing.

Figures 3, 4:
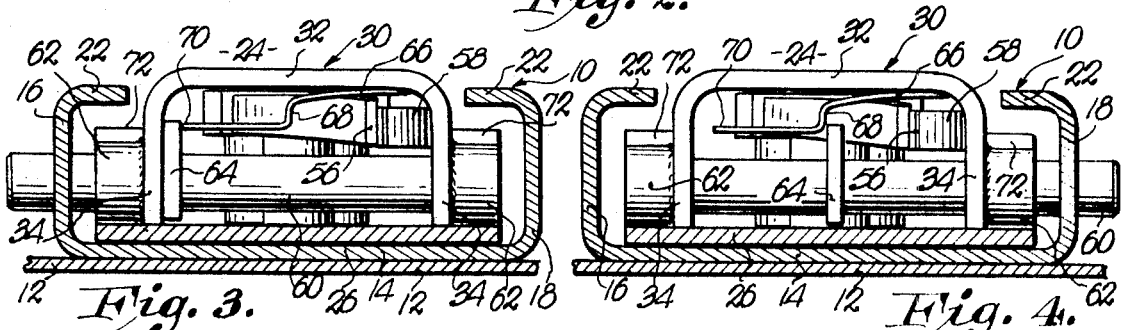
FIG. 3 is a cross-sectional view taken along line 3—3 of FIG. 2.
Figure 5:
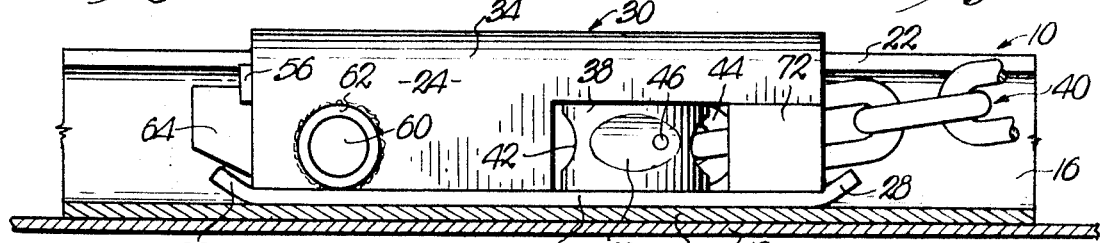

FIG. 4 is a cross-sectional view similar to FIG. 3 but showing the bolt extended through the opposite rail of the track; and FIG. 5 is a vertical cross-sectional view through the track illustrating the holddown unit in side elevation. Elongated tiedown track 10, rigidly secured to deck 12 of a railway car or the like, has a bottom plate 14, a pair of spaced upright rails 16 and 18, integral with plate 14 and in parallel relationship, and each provided with a horizontal series of openings 20 spaced longitudinally therealong. The rails 16 and 18 are provided with overhanging elements 22 in the nature of inwardly extending flanges that are coextensive in length with the rails 16 and 18.

The low profile cargo holddown unit 24 shown within the track 10 upon plate 14 thereof includes a base 26 having upturned ends 28 for facilitating reciprocation of the unit 24 along track 10 as the base 26 slides on the upper face of plate 14 longitudinally of the latter. An elongated, transversely U-shaped housing 30, open at both ends thereof, has a top wall 32 and a pair of sidewalls 34, the latter of which are secured directly to the upper face of base 26.

A winch 36 carried by base 26 and by wall 32 for rotation about a vertical axis has a winding drum 38 for lashing in the nature of a chain 40 adapted to be coiled around the drum 38 when the latter is rotated. Drum 38 is provided with a transverse slot 42 which receives terminal link 44 of chain 40 and a pin 46 across the drum 38 passes through the link 44. Oval concavities in the drum 38 nest the links of chain 40 when the latter is wrapped therearound.

Winch 36 is provided with a polygonal socket 50 for receiving any conventional drive ratchet (not shown). Releasable means for holding the drum 38 against retrograde rotation includes a ratchet wheel 52 and a pawl 54 within housing 30, the ratchet wheel 52 being interposed between drum 38 and wall 32. The pawl 54 is swingably carried by the base 26 and the wall 32 and is provided with a manipulating handle 56. A leaf spring 58 on one of the walls 34 within housing 30 bears against the handle 56 to yieldably hold the teeth of the pawl 54 biased against the teeth of the wheel 52.

A transversely circular, horizontally reciprocable locking bolt 60 traverses the walls 34 within outwardly extending sleeves or bushings 62 integral with the walls 34. The bolt 60 is adapted for selective insertion into any one of the openings 20 of either of the rails 16 and is provided with a rearwardly extending actuating lever 64. A releasable latch 66 on the inner face of wall 32 is in the nature of a resilient plate having a pair of spaced abutments 68 and 70 alternately engageable with the lever 64. The abutment 68 is in the nature of an offset shoulder traversing the latch 66 while the free end of the latch 66 serves as the abutment 70.

A pair of L-shaped members 72, normally spaced below the flange elements 22, are secured to the walls 16 and 18 and to the base 26 exteriorly of the housing 30 adjacent that end of the latter through which the chain 40 extends and remote from the bolt 60 which is disposed at that end of housing 30 through which the handle 56 and the lever 64 extend.

In operation, when the latch 66 is released, bolt 60 may be shifted through use of the lever 64 to a point midway of its path of travel, placing the ends of the bolt 60 substantially flush with the outer ends of the bushings 62. The entire unit 24 may then be shifted longitudinally of the track 10 without any binding therewithin because adequate clearance is provided between all parts of the unit 24 and the rails 16 as well as their inturned flanges 22.

After the unit 24 is properly positioned adjacent or beneath a vehicle or other cargo on deck 12, the lever 64 is actuated to shift the bolt 60 to the right or to the left into a proximal hole 20 within either rail 16 or rail 18.

Figure 1:
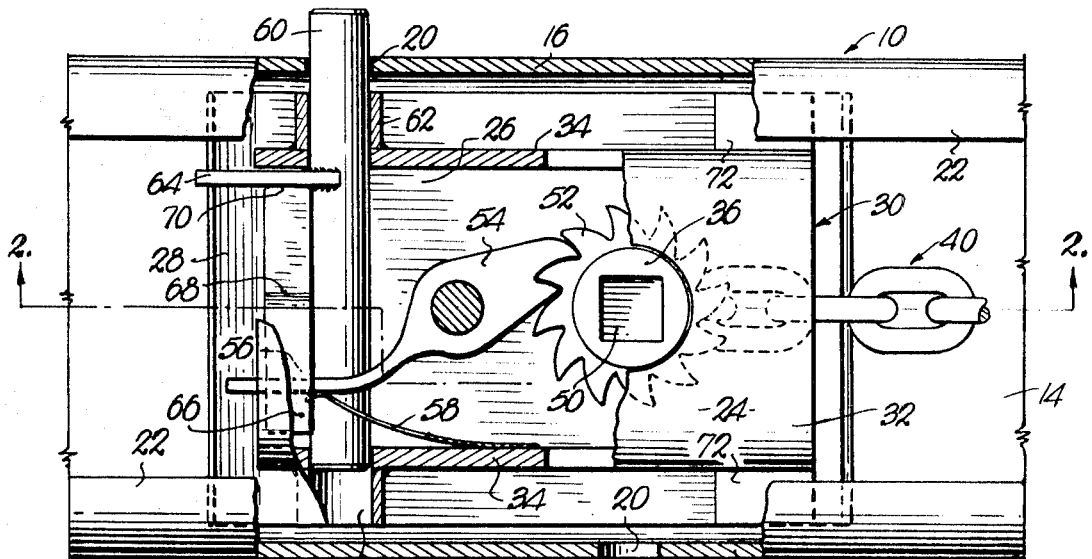
FIG. 1 is a plan view of a low profile vehicle holddown made pursuant to my present invention showing the same in association with the tiedown track, parts being broken away and in section to reveal details of construction.
Figure 2:
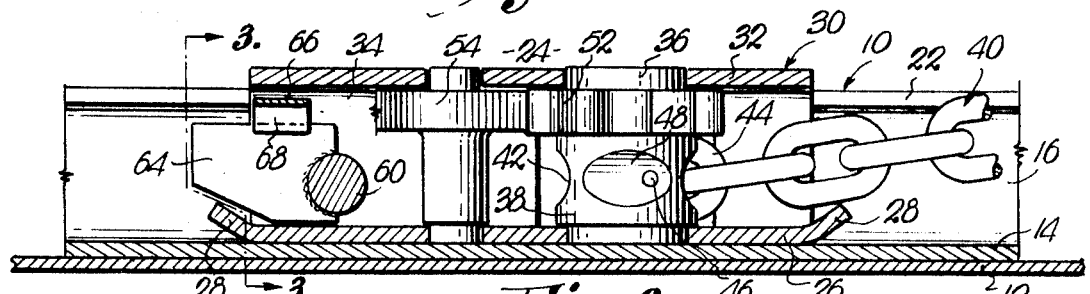
FIG. 2 is a vertical cross-sectional view taken on irregular line 2—2 of FIG. 1.

Thereupon, the outer free end of the chain 40 (not shown) is attached to the cargo and then, through use of the aforementioned drive ratchet in socket 50, the winch 36 is rotated clockwise (viewing FIG. 1) to wind chain 40 about the drum 38 and to thereby take up all slack in the chain 40. During such rotation of the winch 36, the teeth of the ratchet wheel 52 clear the teeth of the pawl 54 by virtue of the leaf spring 58 and after the chain 40 is fully tightened pawl 54 will hold the ratchet wheel 52 and therefore the winch 36, including its drum 38, against anticlockwise rotation.

During such tightening of the chain 40 the unit 24 will tend to tilt upwardly about the bolt 60 as its axis because the latter is freely rotatable within the openings 20. Such tilting is limited by the members 72 coming into engagement with the lower faces of the flange elements 22. Additionally, the innermost edges of the flange elements 22 are adapted to engage the walls 34 and thereby limit the extent of lateral movement of the unit 24.

As note in FIG. 3 of the drawing, when the bolt 60 is shifted to the left into one of the openings 20 of rail 16 the abutment 70 of the latch 66 prevents inward movement of the lever 64 and therefore bolt 60. Conversely, as noted in FIG. 4 of the drawing, when the bolt 60 is within one of the openings 20 of the rail 18 the abutment 68 engages the lever 64 and prevents inward movement of the bolt 60. Both the lever 64 and the handle 66 are readily accessible at the rearmost open end of the housing 30 for finger manipulation. By the same token, the latch 66 may be reached through the rear open end of the housing 30 to raise it to a position clearing the lever 64 of the abutments 68 and 70.

Having thus described the invention, what I claim as new and desire to be secured by Letters Patent is:

1. In combination with an elongated tiedown track having a pair of spaced, upright rails each provided with a horizontal series of openings spaced longitudinally therealong, a low profile cargo holddown on it comprising:

a support;

apparatus on the support for taking up tie means secured to the cargo;

means releasably interconnecting said support and the apparatus for holding the latter against retrograde operation;

a horizontally reciprocable locking bolt carried by said support for insertion into a selected opening in one of said rails when the bolt is shifted in one direction, or into a selected opening in the other of said rails when the bolt is shifted in the opposite direction;

a lateral actuating lever secured to said bolt; and a resilient, releasable latch plate on said support having a first lever-engaging abutment for holding the bolt in a locked condition at one end of its path of travel and a second lever-engaging abutment for holding the bolt in a locked condition at the opposite end of its path of travel.

2. The invention of claim 1, said latch plate extending along said bolt in radially spaced relation thereto and having a free end forming said first abutment.

3. The invention of claim 2, said latch plate being stepped intermediate the opposed ends thereof presenting a shoulder defining said second abutment.

4 The invention of claim 1, said apparatus including a winding drum journaled by the support for rotation about a vertical axis, said bolt being freely rotatable relative to the rails when disposed in any one of said openings, said rails having overhanging elements engaged by said unit during rotation of the drum to take up said tie means for limiting the extent of lateral movement of said unit and for limiting the extent of tilt of the unit about the axis of rotation of said bolt.

5. The invention of claim 4, said support having a pair of members normally spaced below said elements and engageable therewith during tilting of the unit.